United States Patent
Iwakami et al.

(10) Patent No.: US 7,367,855 B2
(45) Date of Patent: May 6, 2008

(54) CABLE SUPPORTING STRUCTURE FOR SMALL BOAT

(75) Inventors: Hiroshi Iwakami, Wako (JP); Tadaaki Nagata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/455,104

(22) Filed: Jun. 19, 2006

(65) Prior Publication Data

US 2007/0001159 A1    Jan. 4, 2007

(30) Foreign Application Priority Data

Jun. 20, 2005    (JP) ............... 2005-179467

(51) Int. Cl.
*B60W 10/04* (2006.01)
(52) U.S. Cl. .................... 440/84; 248/73
(58) Field of Classification Search ............ 248/73; 440/84
See application file for complete search history.

(56) References Cited

U.S. PATENT DOCUMENTS 4,546,949 A * 10/1985 Millett et al. ............ 248/514
6,875,065 B2 * 4/2005 Tsuchiya et al. ............ 440/42
2002/0113173 A1 * 8/2002 Bass ........................ 248/62

FOREIGN PATENT DOCUMENTS

JP    2004-98946 A    4/2004

* cited by examiner

*Primary Examiner*—Stephen Avila
(74) *Attorney, Agent, or Firm*—Birch, Stewart, Kolsach & Birch, LLP

(57) ABSTRACT

A cable supporting structure for facilitating the operation of mounting a cable to a boat. The cable includes a cable inner, a cable outer for surrounding the cable inner, and a stepped portion provided on the cable outer. The cable supporting structure includes a bracket mounted to the boat and having a U-shaped groove for storing the cable outer. The U-shaped groove of the bracket extends horizontally or obliquely downward toward the inner side. A holder including U-shaped grooves that fit the stepped portions of the cable for clamping the cable outer is mounted to the bracket.

11 Claims, 9 Drawing Sheets

CABLE SUPPORTING STRUCTURE FOR SMALL BOAT

CROSS-REFERENCE TO RELATED APPLICATION

The present application claims priority under 35 U.S.C. §119 to Japanese Patent Application No. 2005-179467, filed Jun. 20, 2005, the entire contents of which are hereby incorporated by reference.

BACKGROUND OF THE INVENTION

1. Field of the Invention

The present invention relates to an improved cable supporting structure for supporting a midsection of a cable that connects a steering handle and a device in a boat.

2. Description of Background Art

In a boat, a cable supporting structure for holding a cable that connects a steering handle and a device at a predetermined position is required (for example, JP-A-2004-98946 (FIG. 12).

In FIG. 12 in JP-A-2004-98946, a drive cable supporting structure 120 includes a bracket 121 and a U-shaped portion 125 for attaching an outer pipe 116 to the bracket 121, and is configured to mount the bracket 121 to the boat body side by firstly aligning a deck side mounting face 128 of the bracket 121 to a back side of the deck 20, searching a mounting hole by shifting the mounting face 128, aligning the hole position on the bracket 121 side to the hole on the deck 20 side, inserting bolts 127, 127 in a state where these holes are aligned, and fastening these bolts to the bracket 121.

When an operator mounts the bracket 121 in JP-A-2004-98946 to the deck 20 on his/her own, he/she has to support the bracket 121 with one hand and then tighten the bolts 127, 127 with the other hand. When the bracket 121 is heavy, he/she has to support a heavy object by one hand for a certain period of time, and hence the operator has to bear a great burden.

Subsequently, a drive cable 114 is hooked to the U-shaped portion 125 of the bracket 121 and a nut 124 is turned to fix the outer pipe 116 to the bracket 121 in the state in which the drive cable 114 is hooked.

In other words, the operator has to hold the drive cable 114 in JP-A-2004-98946 by one hand, and rotate the nut 124 with the other hand, whereby the operation is done basically with both hands.

According to the drive cable supporting structure 120 in JP-A-2004-98946, the nut 124 and the bolt 127 are tightened while holding the bracket 121 and the drive cable 114. However, since the interior of the deck of a small boat is narrow, there may be a case in which the operation while holding the bracket 121 or the drive cable 114 is difficult. Therefore, a cable supporting structure that enables easy mounting is desired.

SUMMARY AND OBJECTS OF THE INVENTION

It is an object of the present invention to provide a cable supporting structure that can be mounted to a boat with one hand.

According to a first aspect of the present invention, a midsection of a cable in a small boat to be operated by a steering handle is supported by a supporting structure provided on the boat. A distal end of the cable is connected to a device provided on the boat so that the device is operated by the steering handle. The cable includes a cable inner, a cable outer for surrounding the cable inner, and stepped portions provided on the cable outer. A cable supporting structure includes a bracket mounted to the boat and provided with a U-shaped groove for storing the cable outer, and a holder provided with a U-shaped groove for being fitted to the stepped portions of the cable and clamping the cable outer by being mounted to the bracket. A U-shaped groove provided on the bracket extends horizontally or obliquely downward toward the inner side.

According to a second aspect of the present invention, a midsection of the cable is supported by a cable supporting structure and a distal end of the cable is connected to a device provided on the boat, so that the device is operated by the steering handle. The cable supporting structure includes a bracket mounted to the boat for storing a cable outer of the cable. The bracket is provided with a projection that is inserted into a non-circular hole formed on a boat body in advance and can be fixed by being rotated by a predetermined angle.

According to the first aspect of the present invention, the U-shaped groove provided on the bracket is extended horizontally or obliquely downward toward the inner side. When the cable outer is stored in such the U-shaped groove, the cable outer stays at the inner side of the U-shaped groove, and is not likely to come off. Therefore, an operation such as the bolt tightening in the next step can be performed in a state in which the cable outer is left in the bracket.

In other words, the operation for mounting the cable outer to the bracket can be performed with on hand. When it can be performed with one hand, the cable mounting operation can be performed easily even in a small space in the deck of the small boat.

According to the second aspect of the present invention, the bracket can be secured temporarily to the boat body side only by inserting and rotating the projection on the bracket side into the non-circular hole formed on the boat body side, and hence the hand can be released. By tightening a bolt after it has been temporarily secured by hand, the bracket can be fixed to the boat body.

In other words, since it is not necessary to support the bracket with hand after it has been temporarily secured, the burden of the operator can significantly be reduced in the operation to mount the bracket to the boat body side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
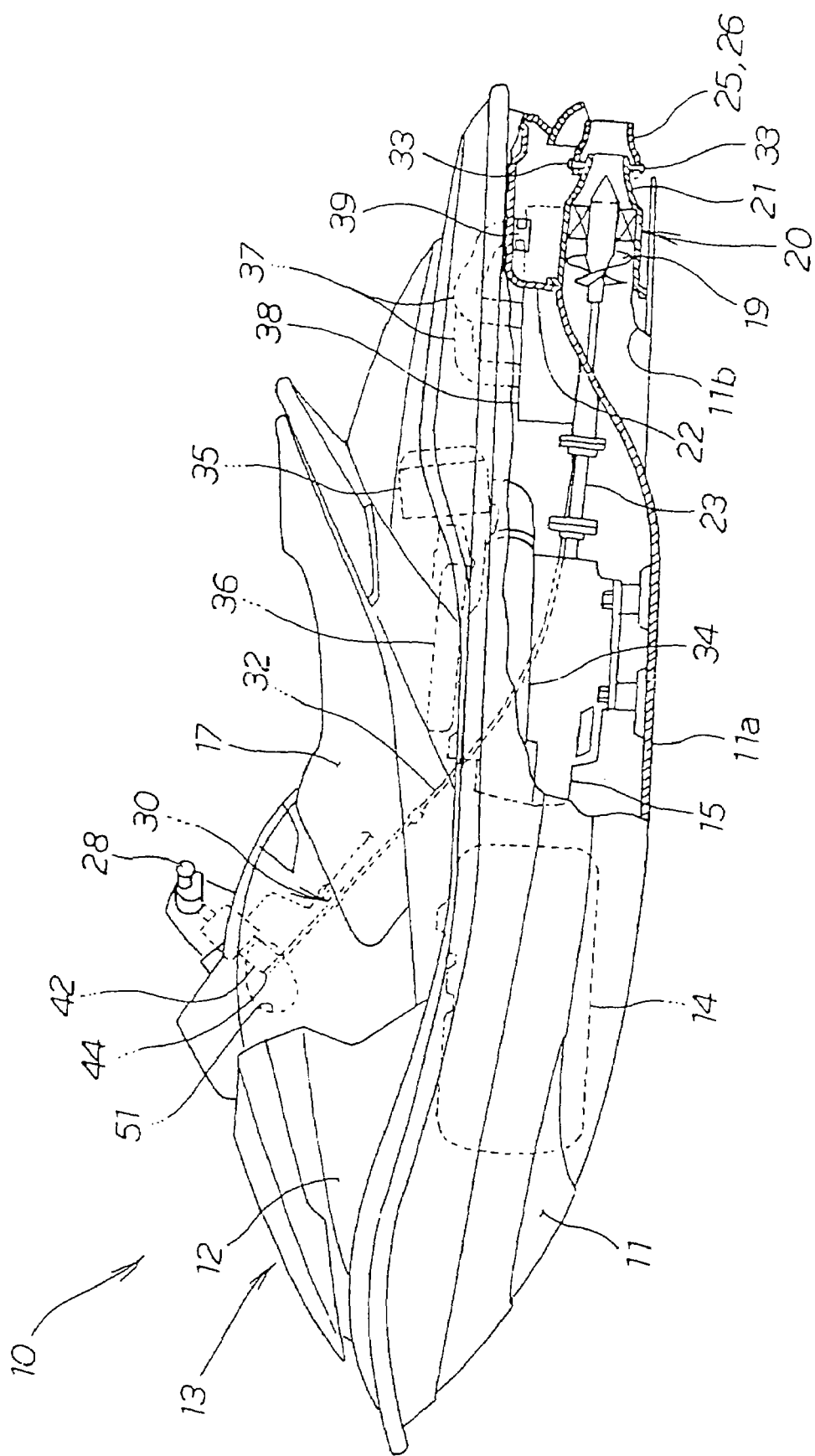
FIG. 1 is a side view of a boat according to the present invention.

FIG. 1 is a side view of a boat according to the present invention. A boat 10 (also referred to as a jet propelled boat 10) includes a boat body 13 having a hull 11 that defines a ship bottom 11a (also referred to as a boat bottom 11a) and a deck 12 that covers over the hull 11, a fuel tank 14 provided in the boat body 13, an engine 15 arranged rearwardly of the fuel tank 14, a saddle-type seat 17 arranged upwardly of the engine 15, a jet pump 20 provided rearwardly of the engine 15, and a steering handle 28 mounted to a position upwardly of the fuel tank 14.

The jet pump 20 is a device including a pump housing 21 extended rearward from an opening 11b of the boat bottom 11a that constitutes the hull 11 and an impeller 19 rotatably mounted in the pump housing 21 for connecting the impeller 19 to a drive shaft 23 of the engine 15.

The engine 15 is driven to rotate the impeller 19 provided on the jet pump 20, and water sucked through the opening 11b of the boat bottom 11a is injected from a steering nozzle 25 via the pump housing 21. Reference numeral 22 designates a jet pump chamber provided with the jet pump 20.

The steering nozzle 25 is a nozzle mounted to a rear end of the pump housing 21 so as to be capable of swinging laterally. The steering nozzle 25 is a steering device 26 that controls the steering direction of the boat body 13 by being swung laterally by the operation of the steering handle 28.

The device 26 can be operated by the use of the steering handle 28 such as the steering handle and a cable 32.

In other words, the jet propelled boat 10 is a boat that travels on the water by supplying fuel from the fuel tank 14 to the engine 15 to drive the engine 15, transmitting the drive force of the engine 15 to the jet pump 20 via the drive shaft 23, sucking water through the opening 11b of the boat bottom 11a by driving the jet pump 20, and injecting sucked water through the rear end of the pump housing 21 from the steering nozzle 25 directed to the steering direction by the steering handle 28 as a jet water.

FIG. 1 also shows air-intake duct 34, an air cleaner 35, a suction path 36 as an air-intake system provided in the engine 15, an exhaust pipe 37, a water muffler 38, and an opening-closing valve 39 as an exhaust system provided in the engine 15.

Figure 2:
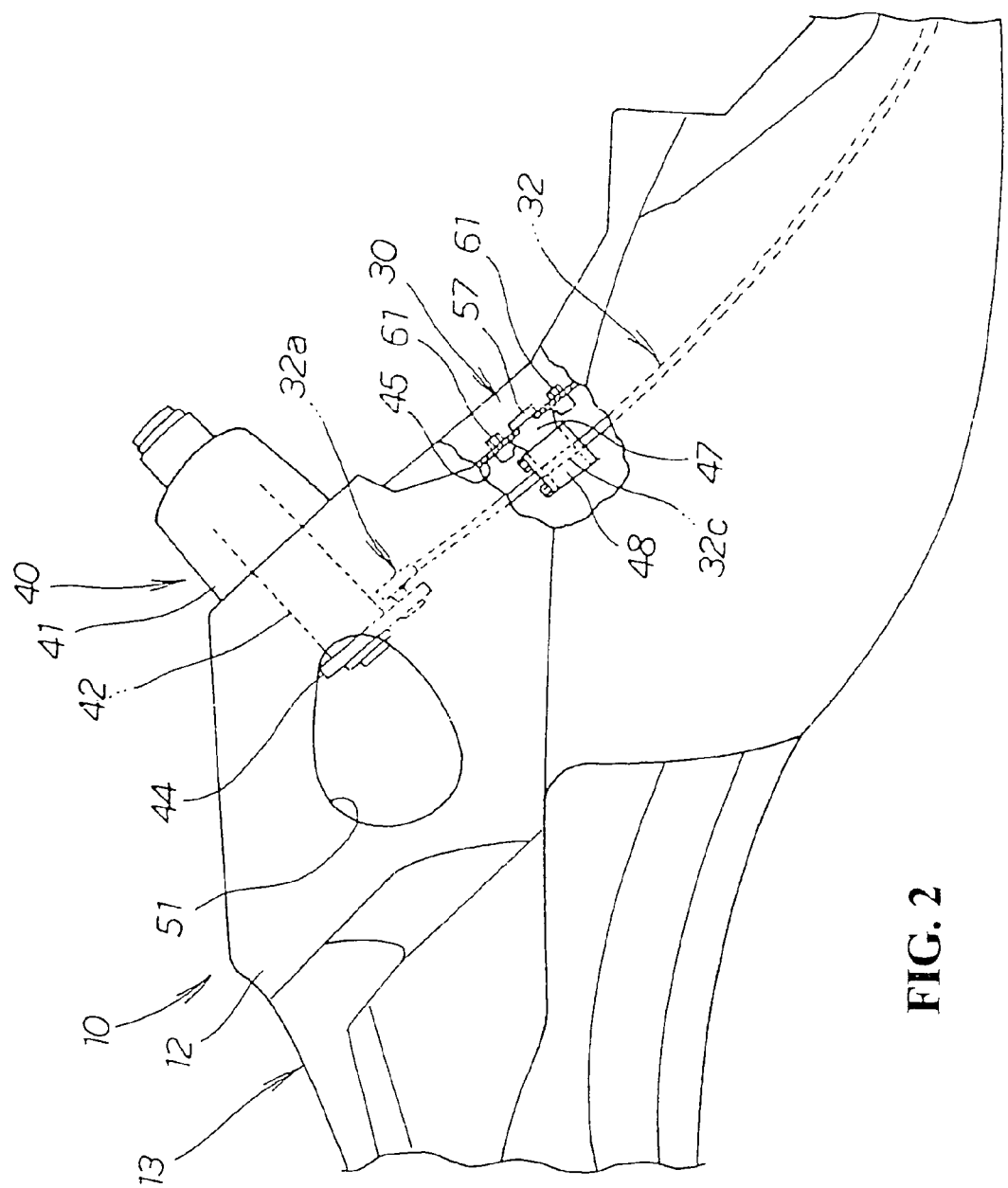
FIG. 2 is a side view of a principal portion of the boat according to the present invention.

FIG. 2 is a side view of a principle portion of the boat according to the present invention, showing that a steering mechanism 40 includes a steering shaft 42 rotatably connected to a steering column 41, a lever-shaped arm 44 mounted to a lower end of the steering shaft 42, the cable 32 as a connecting member being connected at a one end 32a thereof to the arm 44, and the cable 32 being supported by a cable supporting structure 30 at a midsection 32c thereof. The detailed description of the cable supporting structure 30 will be given later.

Reference numeral 51 designates a work window formed on the deck 12. The work window 51 is arranged forwardly of the cable supporting structure 30 around the steering shaft 42, and is, for example, a window for mounting or dismounting the cable 32 to the cable supporting structure 30, which is normally (when not working) closed with a lid member, not shown.

Figure 3:
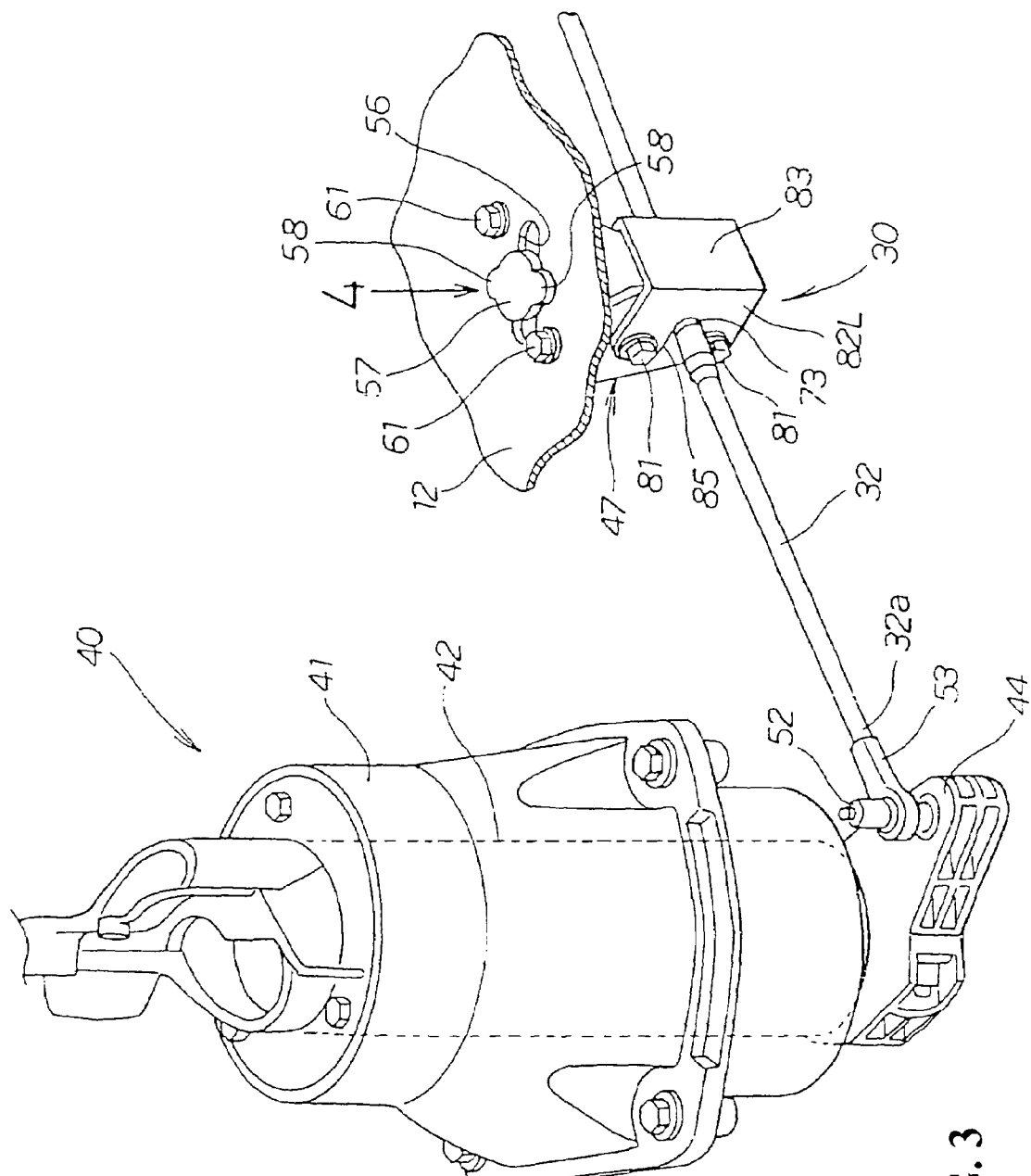
FIG. 3 is a perspective view of a cable supporting structure of a small boat according to the present invention.

FIG. 3 is a perspective view of the cable supporting structure of a small boat according to the present invention, in which the arm 44 is provided at a lower end of the steering mechanism 40, the cable 32 is connected at the one end 32a to the arm 44 via a connecting member 53, and the midsection 32c of the cable 32 is supported by the cable supporting structure 30 mounted to a lower surface 45 (see FIG. 2) of the deck 12.

In this embodiment, the cable supporting structure 30 supports the midsection 32c of the cable 32 that connects between the steering shaft 42 and the steering nozzle 25 (see FIG. 1). In addition, for example, it may support midsections of other cables provided in the small boat such as an accelerator cable or a reverse cable.

Figure 4:
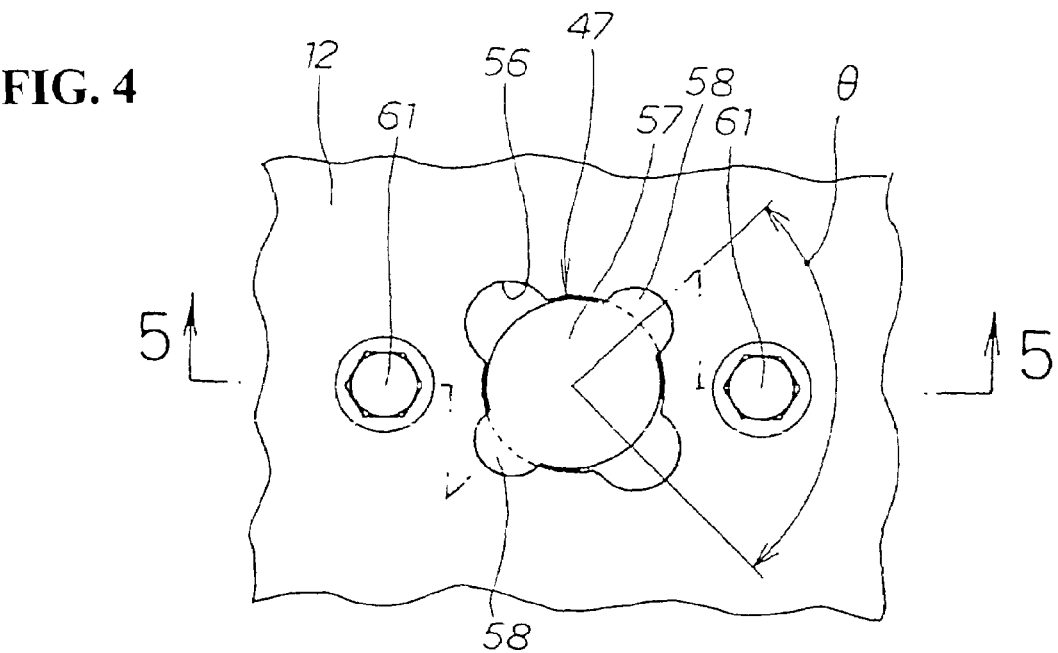
FIG. 4 is a drawing viewed in the direction indicated by an arrow 4 in FIG. 3.

FIG. 4 is a drawing viewed in the direction of an arrow 4 in FIG. 3 showing a state in which a non-circular hole 56 is formed on the deck 12, a column portion 57 provided on the side of a bracket 47 is inserted into the non-circular hole 56, and the column portion 57 is rotated by an angle θ (for example, 90°), thereby covering projections 58, 58 over an upper surface of the deck 12.

Figure 5:
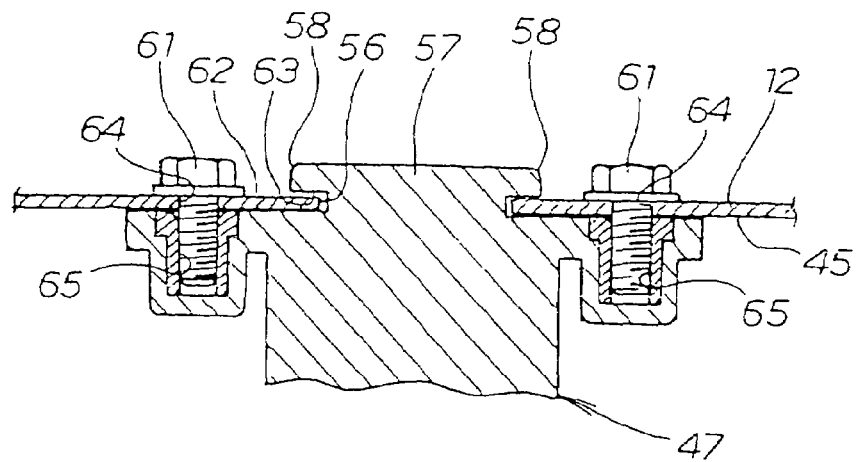
FIG. 5 is a cross-sectional view taken along the line 5-5 in FIG. 4.

FIG. 5 is a cross-sectional view taken along the line 5-5 in FIG. 4, showing that the column portion 57 provided on the bracket 47 is inserted into the non-circular hole 56 and rotated, so that the deck 12 of the boat body 13 (see FIG. 2) is clamped between a seat portion 62 provided on the bracket 47 and a groove 63 formed between the projections 58, 58 and tightening holes 65, 65 provided on the bracket 47 side are aligned with holes 64, 64 provided on the boat body 13.

In other words, the bracket 47 includes the projections 58, 58 that can be fixed by being inserted into the non-circular hole 56 formed on the boat body 13 in advance and being rotated by a predetermined angle.

In this embodiment, the bracket 47 includes the tightening holes 65, 65. These tightening holes 65, 65 are holes formed by integrally molding nuts 67, 67 and the brackets 47 when molding the bracket 47. Alternatively, a bolt and nut tightening structure in which the nut is not integrated with the bracket and is tightened separately is also applicable.

Figure 6:
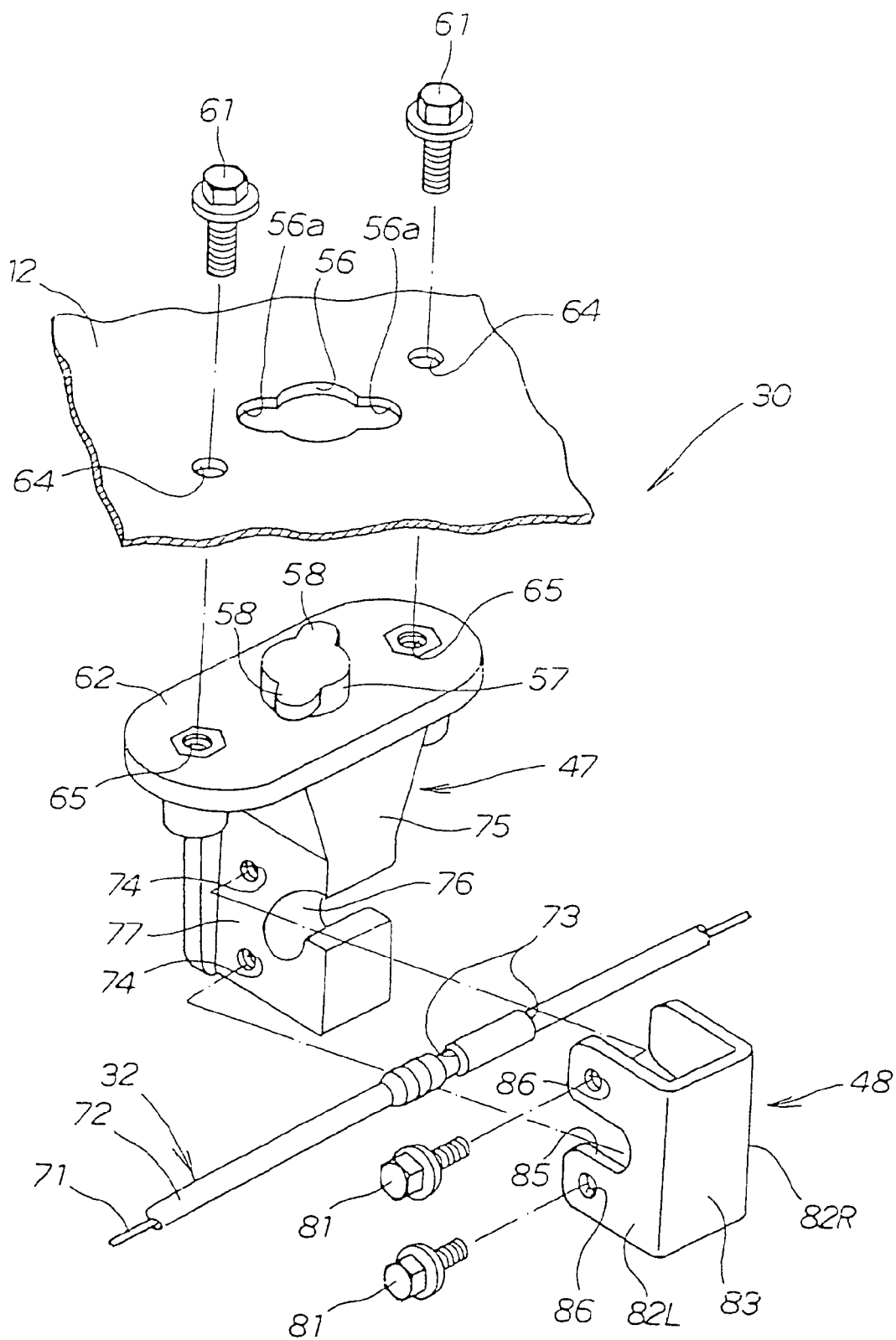
FIG. 6 is an exploded perspective view of the cable supporting structure of the small boat according to the present invention.

FIG. 6 is an exploded perspective view of the cable supporting structure of the small boat according to the present invention. The cable 32 includes a cable inner 71, a cable outer 72 that surrounds the cable inner 71, and stepped portions 73 provided on the cable outer 72.

The cable supporting structure 30 includes the bracket 47 to be mounted from below the deck 12, and a holder 48 of an angular C-shape in cross section to be mounted to the bracket 47 from the side.

The bracket 47 includes the projections 58, 58 to be fixed or temporarily secured to the deck 12, the seat portion 62 provided under the projections 58, 58 for being abutted against a lower surface of the deck, screw holes 65, 65 as female screws formed on the seat portion 62, a body portion 75 mounted so as to extend downward from the seat portion 62, a U-shaped groove 76 formed on the body portion 75 so as to extend horizontally or obliquely downward toward the inner side for storing the cable outer 72, and holder tightening holes 74, 74 for tightening the holder 48 to a side surface 77 of the body portion 75.

The holder 48 is the angular C-shaped member including left and right side portions 82L, 82R and a connecting portion 83 for connecting these side portions 82L, 82R, and is provided with U-shaped grooves 85 formed on the left and right side portions 82L, 82R for being fitted to the stepped portions 73 of the cable.

The left side portion 82L is formed with bolt holes 86, 86 for tightening bolts 81, 81 for mounting the holder 48 to the bracket 47.

In other words, the cable supporting structure 30 is a structure including the holder 48 having the U-shaped grooves 85 to be fitted to the stepped portions 73 of the cable and clamping the cable outer 72 by being mounted to the bracket 47, and the U-shaped groove 76 provided on the bracket 47 extending horizontally or obliquely downward toward the inner side.

The operation of the cable supporting structure as configured as described above will be described below.

Figure 7:
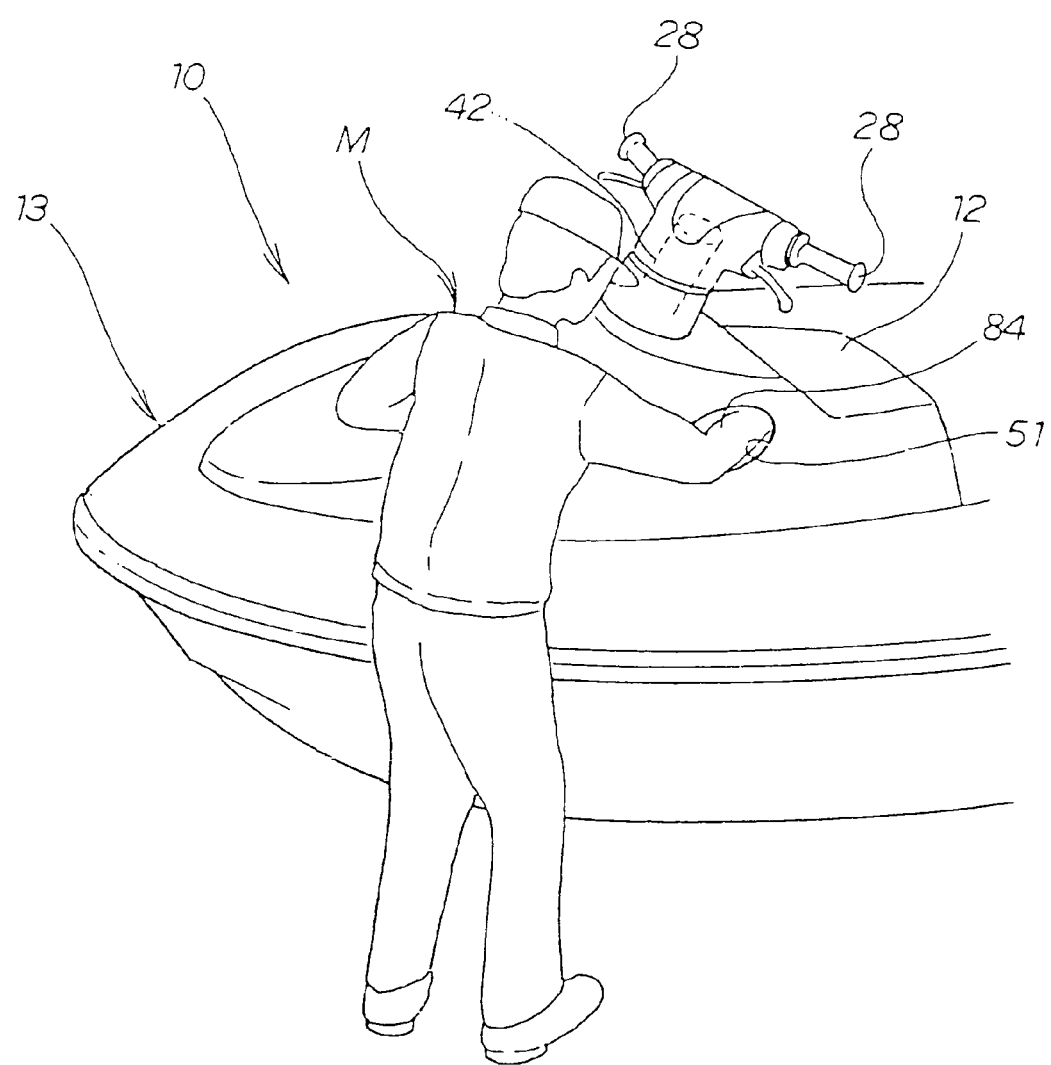
FIG. 7 is an explanatory drawing showing a behavior of an operator.

FIG. 7 is a drawing explaining a behavior of the operator. An operator M can perform a mounting operation of the cable supporting structure described below by inserting his right hand 84 from the work window 51 formed on the deck 12.

Figure 8A:
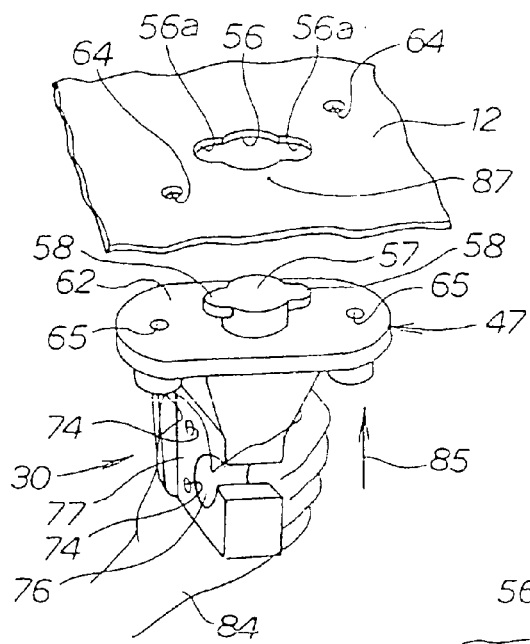
FIGS. 8(a), 8(b), and 8(c) are illustrations showing points of mounting operation of a bracket according to the present invention.
Figure 8B:
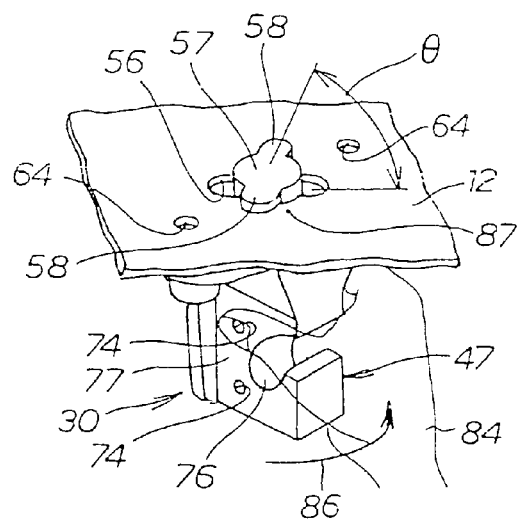
Figure 8C:
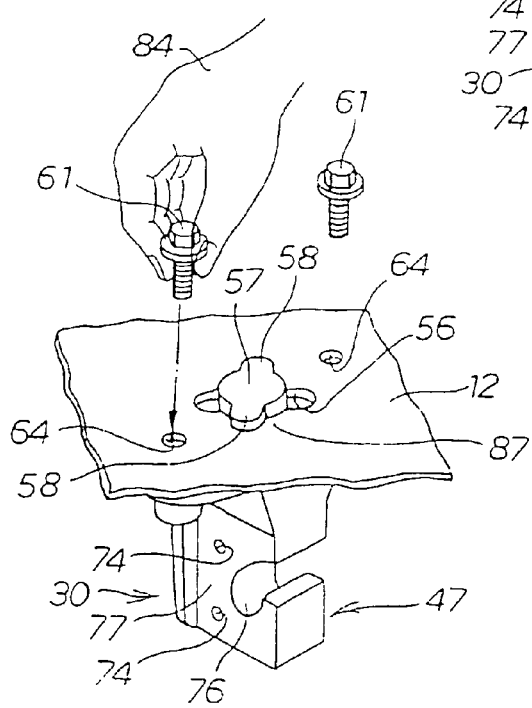

FIGS. 8(a), 8(b), and 8(c) are illustrations showing points of mounting operation of a bracket according to the present invention.

In FIG. 8(a), the bracket 47 held by the right hand 84 is moved upward as shown by an arrow 85. Then, the projections 58, 58 on the bracket 47 side are passed through notched portions 56a, 56a of the non-circular hole 56. Accordingly, the seat portion 62 of the bracket 47 can be abutted against the lower surface of the deck 12.

In FIG. 8(b), the bracket 47 is rotated by an angle θ as shown by an arrow 86, so that the projections 58, 58 are engaged with a periphery 87 of the non-circular hole 56, and the screw holes 65, 65 on the seat portion 62 are aligned with the holes 64, 64 on the deck 12 side.

Since the projections 58, 58 are placed on the periphery 87 of the non-circular hole 56, there is no possibility that the bracket 47 drops even though the operator releases his right hand 84. Therefore, the operator releases his right hand 84 from the bracket 47 to make it free.

In FIG. 8 (c), the operator pinches a bolt 61 with his right hand 84, which is free now, and places the same at a position above the deck 12 so as to oppose thereto. Then, the bolt 61 is placed in the hole 64 and secured temporarily by rotating several times. The remaining bolt 61 is also tightened temporarily in the same manner. Subsequently, the bolts 61, 61 are securely tightened with a tool such as a screw wrench or the like, not shown.

With the operation described thus far, the operation to mount the bracket 47 to the deck 12 is completed.

The mounting operation of the bracket 47 to the deck 12 can be performed only by the right hand 84 (or the left hand). In addition, in FIG. 8(c), it is not necessary to support the bracket 47 with the hand, and hence the burden of the operator can be significantly reduced.

The non-circular hole 56 is formed by combining two notches 56a, 56a to a round hole. However, the number or the shape of the notches 56a, 56a may be determined as desired. In the same manner, the number or the shape of the projections 58, 58 provided on the column portion 57 may also be determined as desired.

Figure 9A:
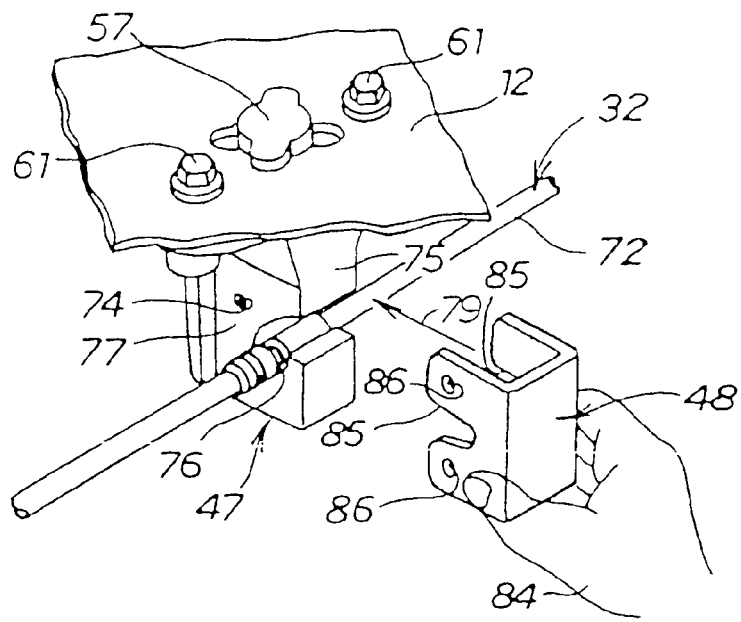
FIGS. 9(a), 9(b), and 9(c) are illustrations showing points of mounting operation of a cable outer according to the present invention.
Figure 9B:
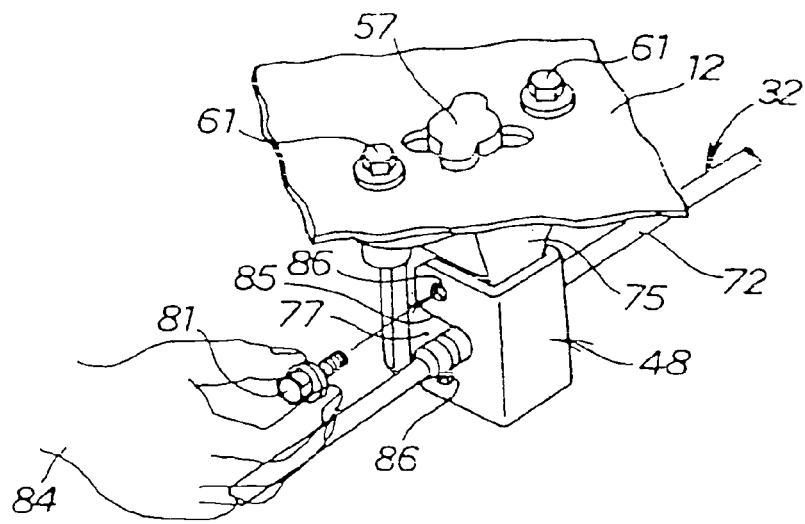
Figure 9C:
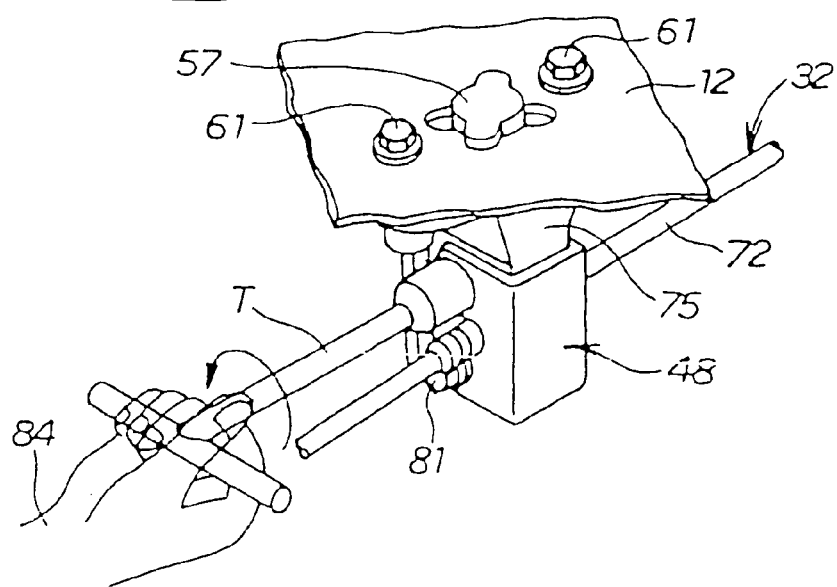

FIGS. 9(a), 9(b), and 9(c) are illustrations showing points of mounting operation of the cable according to the present invention.

In FIG. 9(a), the cable outer 72 that constitutes an outside of the cable 32 is placed on the U-shaped groove 76 of the bracket 47, then the holder 48 is pinched with the right hand 84, and then the holder 48 is inserted toward the side surfaces 77 of the bracket 47 in the direction indicated by an arrow 79, whereby the U-shaped grooves 85 are engaged with the U-shaped groove 76.

In FIG. 9(b), the tightening bolt 81 is pinched with the right hand 84, which is free now, and inserted into the holder tightening hole 74 and turned several times to secure the same temporarily.

In FIG. 9(c), the operator holds a bolt tightening tool T with his right hand 84, and tighten the tightening bolts 81, 81 securely with the bolt tightening tool T.

The mounting operation of the cable 32 is ended with the procedure described above.

The series of operations shown in FIG. 9(a) to 9(c) can be performed only with the right hand 84 (or the left hand).

In other words, the operation to mount the cable outer 72 to the bracket 47 can be performed with one hand. When it can be operated with one hand, the cable mounting operation can be performed easily even within a small space in the deck of the small boat.

Another embodiment of the present invention will now be described.

Figure 10A:
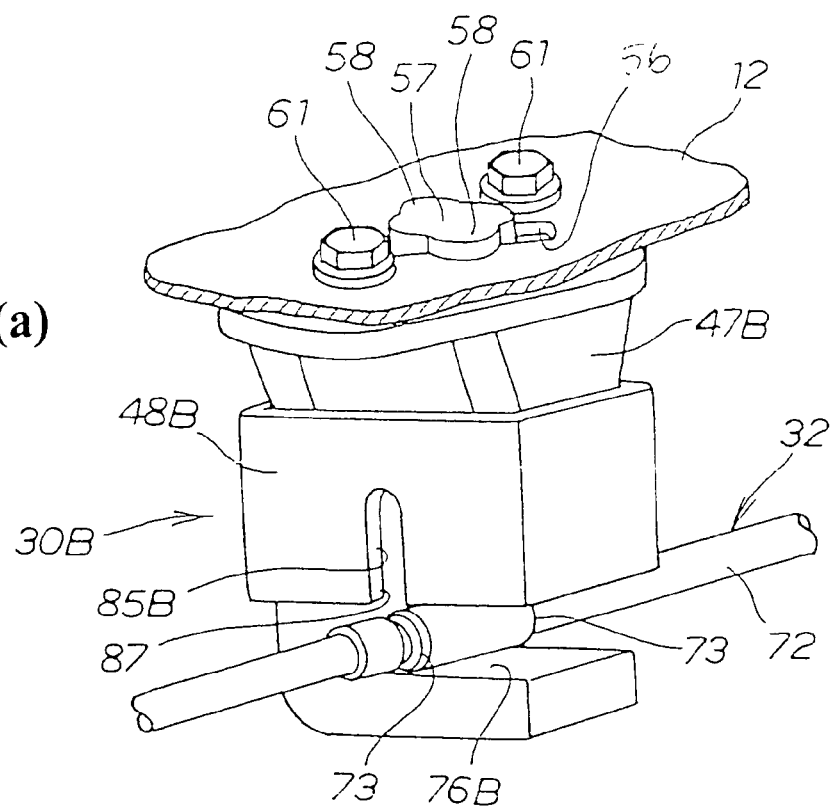
FIGS. 10(a) and 10(b) are drawings showing another embodiment of the cable supporting structure and a mounting operation in FIG. 3.
Figure 10B:
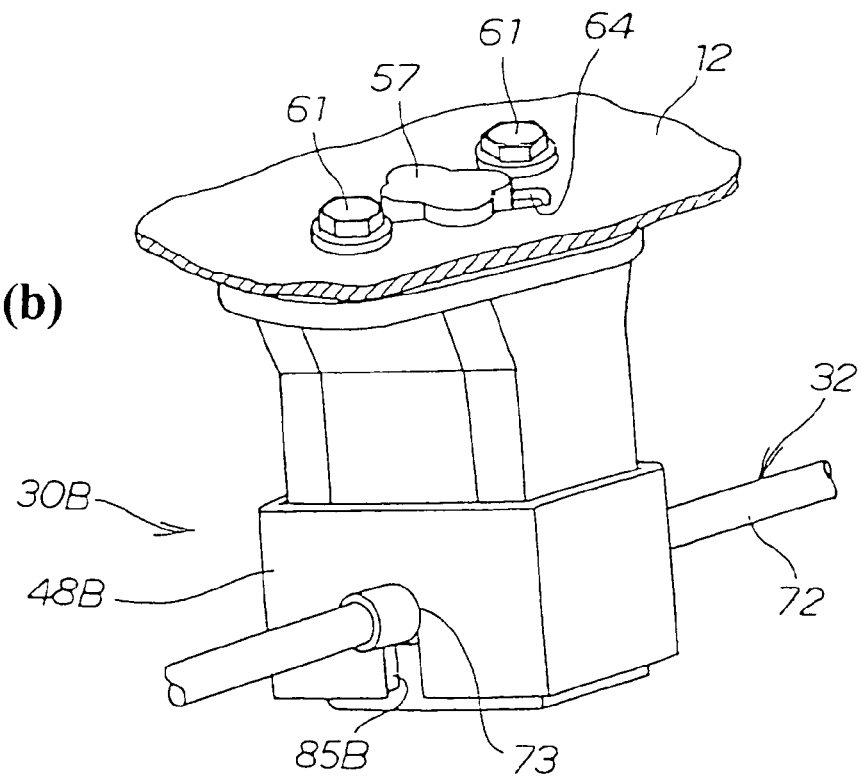

FIGS. 10(a) and 10(b) are drawings showing another embodiment of the cable supporting structure shown in FIG. 3. Since the configurations of the projections 58, 58 of a bracket 47B, and a non-circular hole 56 that engages with the projections 58, 58 are the same as those in FIG. 3, description will be omitted, and configurations of the bracket 47B and a holder 48B to be mounted to the bracket 47B will be described.

In FIG. 10(a), a cable supporting structure 30B includes a bracket 47B provided with a U-shaped groove 76B, and a holder 48B including U-shaped grooves 85B, 85B (only the groove 85B on the near side is shown) fitted to the stepped portions 73, 73 of the cable for clamping the cable outer 72 by being mounted to the bracket 47B.

A point different from FIG. 3 is that the U-shaped groove 76B provided on the bracket 47B is provided horizontally, and the U-shaped grooves 85B, 85B (only the groove 85B on the near side is shown) provided on the holder 48B is disposed in the vertical direction so that openings 87, 87 (only the opening 87 on the near side is shown) are opened downward.

Since the openings 87, 87 are opened downward, the U-shaped grooves 85B, 85B (only the groove 85B on the near side is shown) are fitted to the stepped portions 73, 73 of the cable by its own weight of the holder 48B so that the cable 32 can hardly be separated from the holder 48B.

FIG. 10(b) shows that the outer 72 of the cable is inserted into the U-shaped groove 76B of the bracket 47B and the holder 48B is mounted so that the U-shaped grooves 85B, 85B are fitted to the stepped portions 73, 73 of the cable inserted into the U-shaped groove 76B.

While the present invention is applied to the small boat in this embodiment, it can be applied to motorcycles or four-wheel vehicles without problem.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cable supporting structure in a boat for supporting a midsection of a cable, the cable including a cable inner, a cable outer for surrounding the cable inner, and stepped portions provided on the cable outer, a distal end of the cable being connected to a device provided on the boat so that the device is operated by the steering handle, the cable supporting structure comprising:

a bracket mounted to the boat and provided with a U-shaped groove for storing the cable outer; and a holder provided with a U-shaped groove for accommodating the stepped portions of the cable and clamping the cable outer by being mounted to the bracket, wherein the U-shaped groove provided on the bracket extends horizontally or obliquely downward toward an inner side, wherein the holder is disposed around side surfaces of a body portion of the bracket, and is adapted to be slidable in an up and down direction with respect to the body portion of the bracket, wherein the U-shaped groove on the holder is a pair of U-shaped grooves disposed in a vertical direction so that openings of the grooves are opened downward.

2. The cable supporting structure according to claim 1, wherein the bracket includes projections adapted to be fixed or temporarily secured to a deck of the boat, a seat portion provided under the projections adapted to be abutted against a lower surface of the deck, a body portion extending downwardly from the seat portion, and at least one holder tightening hole for tightening the holder to a side surface of the body portion of the bracket.

3. The cable supporting structure according to claim 1, wherein the U-shaped grooves of the holder are adapted to fit around the stepped portions of the cable when the holder slides downward by weight of the holder, whereby the cable cannot be separated from the holder.

4. A cable supporting structure in a boat for supporting a midsection of the cable, and end of the cable being connected to an end of an arm that is rotated by a steering handle, and a distal end of the cable being connected to a device provided on the boat, so that the device is operated by the steering handle, the cable supporting structure comprising:

a bracket mounted to the boat for storing a cable outer of the cable; and an angular C-shaped holder having left and right side portions and a connecting portion for connecting the side portions, a U-shaped groove of the holder being formed on each of the left and right side portions for fitting around to the midsection of the cable, wherein the bracket is provided with a projection that is inserted into a non-circular hole formed on a boat body and is adapted to be fixed by being rotated by a predetermined angle.

5. The cable supporting structure according to claim 4, wherein the projection of the bracket includes a pair of projections extending from sides of a column portion of the bracket.

6. The cable supporting structure according to claim 5, wherein the projections of the bracket are adapted to pass through notched portions of the non-circular hole on the boat body.

7. The cable supporting structure according to claim 4, wherein the one of the left and side portion of the holder is formed with a bolt hole for accommodating a tightening bolt for mounting the holder to the bracket.

8. A cable supporting structure in a vehicle for supporting a midsection of a cable, the cable including a cable inner, a cable outer for surrounding the cable inner, and stepped portions provided on the cable outer, a distal end of the cable being connected to a device provided on the vehicle so that the device is operated by the steering handle, the cable supporting structure comprising:

a bracket adapted to be mounted on a cover portion of the vehicle and provided with a U-shaped groove for storing the cable outer; and a holder provided with a U-shaped groove for accommodating the stepped portions of the cable and clamping the cable outer by being mounted to the bracket, wherein the U-shaped groove provided on the bracket extends horizontally or obliquely downward toward an inner side, wherein the bracket includes projections adapted to be fixed or temporarily secured to the cover portion of the vehicle, a seat portion provided under the projections adapted to be abutted against a lower surface of the cover portion of the vehicle, a body portion extending downwardly from the seat portion, and at least one holder tightening hole for tightening the holder to a side surface of the body portion of the bracket.

9. The cable supporting structure according to claim 8 wherein the holder is the angular C-shaped member including left and right side portions and a connecting portion for connecting the side portions, the U-shaped groove being formed on each of the left and right side portions for fitting around the stepped portions of the cable.

10. The cable supporting structure according to claim 9, wherein the one of the left and side portion of the holder is formed with a bolt hole for accommodating a tightening bolt for mounting the holder to the bracket.

11. The cable supporting structure according to claim 8, wherein the holder is disposed around side surfaces of a body portion of the bracket, and is adapted to be slidable in an up and down direction with respect to the body portion of the bracket.

* * * * *